G. C. JAMES.
FEED GUIDE.
APPLICATION FILED AUG. 22, 1910.
1,000,915.
Patented Aug. 15, 1911.
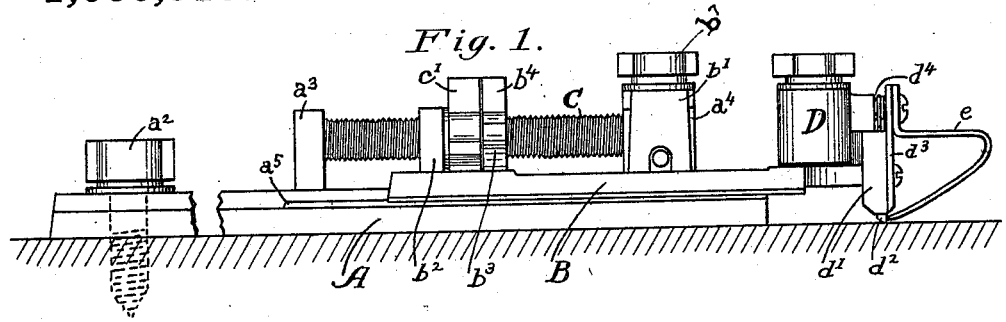
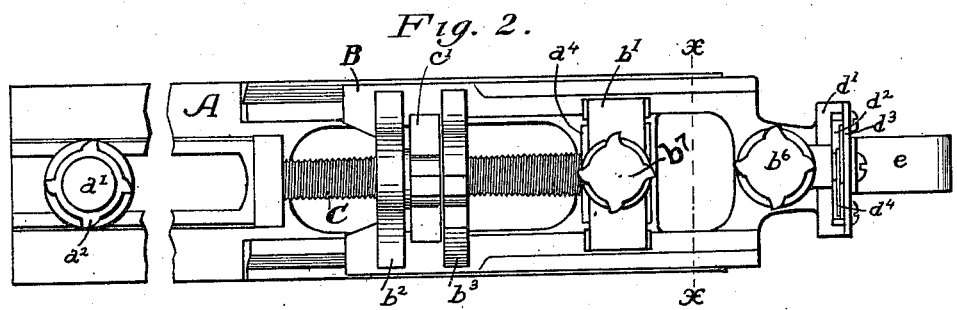
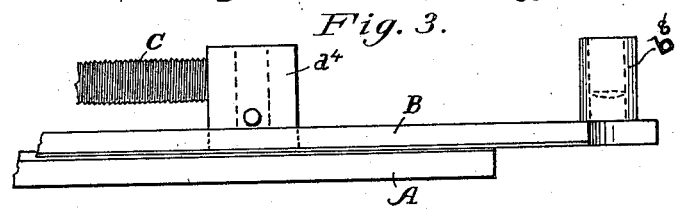
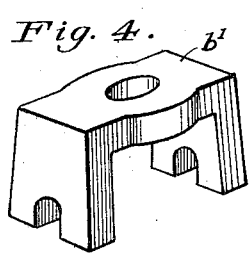
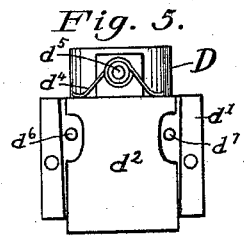
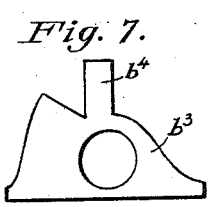
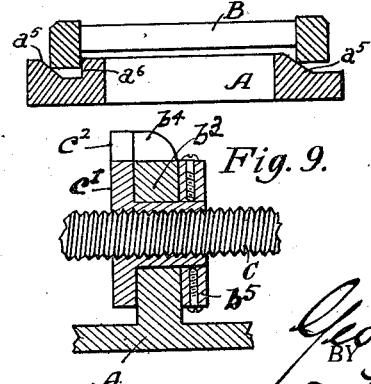
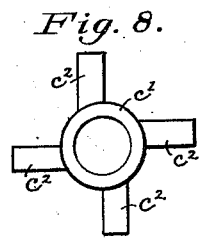
WITNESSES:
INVENTOR.
George C. James,
BY Lewis M. Hosea,
ATTORNEY.
COLUMBIA PLANOGRAPH CO., WASHINGTON, D. C.

UNITED STATES PATENT OFFICE.

GEORGE C. JAMES, OF CINCINNATI, OHIO.

FEED-GUIDE.

1,000,915.   Specification of Letters Patent.   Patented Aug. 15, 1911.

Application filed August 22, 1910. Serial No. 578,382.

*To all whom it may concern:*

Be it known that I, GEORGE C. JAMES, a citizen of the United States, residing at Cincinnati, in the county of Hamilton and State of Ohio, have invented new and useful Improvements in Feed-Guides, of which the following is a specification.

My invention relates to adjustable guides, to be employed in connection with machines of various kinds for properly directing the feed of articles to the parts of machines, designed to act upon them.

The illustration shown in this application is a guide used on printing presses, where it is necessary to feed in the sheets of paper to the cylinder guides in exact relation thereto, in order to insure exactness in the relative position of the resulting imprint upon the sheet. In such work, and particularly in color printing, for example, where variously colored parts of the several designs are successively imprinted, the necessity of great exactitude in the feeding relations of the sheet is obvious. It will be readily understood, therefore, that the adjustment of the feed guides is a matter of care and patience, often involving a considerable expenditure of time.

In present practice, the minor adjustments necessary in reaching the desired result are successive approximations made by estimate of the operator and "tried out" by actual operations of the press. As the cylinder presses generally used in such work are large, and have large feed boards, the operator is required to pass around to the opposite side of the feed board, in order to make such minor adjustments.

The object of my invention is to overcome these disadvantages and provide a feed guide so constructed as to be capable of operation in predetermined and exact distances of adjustment (as by "points" in the printing trade) and by such means as shall not depend upon estimation of distance or reference to a separate gage or similar standard, but requires only operations of a movable part by the hand in relation to fixed surfaces, so that the adjustment desired is made and determined by touch of the fingers, and the automatic registering of movable with fixed parts.

To these ends, and to secure other advantages incidental thereto, which will be more particularly referred to herein, my invention consists in a guiding device herein described and illustrated, embodying the said principle.

In the drawings attached to and forming part of this specification:—Figure 1 is a side elevation of a guide for the feed of the sheet in cylinder printing presses; Fig. 2 is a plan view of same; Fig. 3 is a detail in side elevation of certain parts; Fig. 4 is a perspective view of the yoke employed to clamp the sliding frame in adjusted positions upon the fixed or base plate; Fig. 5 is a front view in elevation of the sliding frame with the front plate and nose piece removed to show the seating of the movable plate or guide-piece and the relation of the spring thereto; Fig. 6 is a cross section of the base plate and sliding frame showing one mode of constructing the guide surfaces in relation to each other; Fig. 7 is a side view detached of one of the uprights of the sliding frame; Fig. 8 is a side view detached of the rotating nut showing its radial projections or finger pieces; and Fig. 9 is an alternative construction and arrangement of the rotating nut and its bearings.

Referring now to the drawings: The device illustrated consists of a pivoted base plate, A, constructed with suitable parallel guiding surfaces for the reception and play of a sliding frame, B, the latter carrying at its forward end a swiveled guide-head, D. These, and their other incidental parts, and their several functions, will be described in the order indicated.

The base-plate A, is a flat rectangular plate, provided at its rear end with a pivot bolt, $a^1$, operated by its head, $a^2$, formed as a "thumb nut" for manipulation. The shank of the bolt passes through a corresponding aperture of the plate into the feed board, and engages therein to secure the same thereto in radially adjustable relations. Somewhat forward of the bolt, $a^1$, upon the plate, A, rises a fixed post $a^3$, and at some distance beyond the latter, a second fixed post, $a^4$; and, secured fixedly to and between the posts is a cylindrical rod, C having cut thereon circumferentially a continuous screw-thread, of a pitch suitable to the work to be performed. In the case illustrated, the thread is made to correspond with the "point system" of measurement used in typographic operations; that is, the distances between two successive threads being two "points."

The parallel guide surfaces of the base plate A may be ordinary V-shaped grooves, or may be formed as corresponding inclines, $a^5$, one of which is flanked by a vertical wall, $a^6$, (as shown in Fig. 6) which forms a limiting guide wall, against which bears the corresponding wall of a sliding frame, presently to be described, by which means the sliding frame is retained always in exact lateral relations with the base in the longitudinal travel and adjustments of the sliding frame.

The sliding frame, B, is provided with downwardly projecting surfaces to rest in or upon and be guided by the guide surfaces of the base plate A, on which the sliding frame is free to move longitudinally, except as fixedly held by a yoke, $b^1$, adapted to seat at its ends upon the upper surface of the sliding frame at the sides of the post, $a^4$ over the top of which the yoke extends and to which it is held by an adjustable set-screw, $b^7$, operating to clamp the sliding frame B firmly to the base-plate A, and thus secure the former in adjusted relation to the latter. Loosening the set-screw allows the sliding frame to be moved back and forth upon the base-plate A, which movements are accomplished by a thumb nut, $c^1$, operating upon the screw rod, C. The thumb nut $c^1$ may occupy the space between two parallel abutments, $b^2$, $b^3$, rising from the sliding frame across the position of the screw, which passes without contact through suitable apertures in said abutments, all as shown in Figs. 1 and 2. An alternative construction of this feature, which I prefer, is shown in Fig. 9, in which one of the abutments (as $b^2$) is omitted, and the thumb nut $c^1$ constitutes a flanged end of a sleeve threaded upon the screw rod C and passing through a correspondingly enlarged aperture in the abutment $b^3$. A ring, $b^5$ seated upon the projecting end of the sleeve and held by radial set screws, bears against the side of the abutment opposite the flange $c^1$, and is adjustable to take up lost motion.

The thumb nut, $c^1$, is formed with one or more radial wings, $c^2$, (see Fig. 8) and the abutment $b^3$ is formed with one or more corresponding radial wings $b^4$ (see Fig. 7), so that in the rotation of the nut, $c^1$, one of its radial wings, $c^2$, will at one complete revolution of the nut, or at each predetermined portion of a complete revolution, register with the fixed wing $b^4$ of the abutment $b^3$,—those wings being so formed as to bring their corresponding surfaces into exact alinement, determinable by the fingers of the operator, without sight.

It will be seen that since the nut $c^1$ (or sleeve) is threaded upon the screw rod C, its revolution advances or withdraws it upon the screw rod, and by contact with the abutment $b^3$ (or both abutments) compels a corresponding advance or retrogression of the sliding frame B on its guiding surfaces of contact with the base-plate A.

As already explained, the sliding frame is clamped to adjusted positions on the base plate by the yoke, $b^1$.

The sliding frame, B, carries at its extreme forward end a post, $b^8$, on which is swiveled a head, D, having a forward depending projection $d^1$. The head, D, is by its swivel mounting, readily adjustable radially in a horizontal plane in relation to the sliding frame, B, and is held in adjusted positions by a thumb-screw, $b^6$, threaded axially into a countersunk socket in the post, $b^5$. The forward and downwardly projecting portion, $d^1$, of the head is recessed at its forward face (as indicated in Figs. 2 and 5) to carry a sliding piece $d^2$ consisting of one or more parts behind a covering plate, $d^3$, fastened by screws. The sliding piece is normally impelled downward within limits of play, by a spring, $d^4$, coiled about the upper fastening screw, $d^5$, of covering plate, $d^3$, and bears downward at its free ends upon the upper edge of the sliding piece $d^2$, the limits of whose vertical play is determined by lateral recesses in the sliding piece, $d^2$, which admit the lower fastening screws, $d^6$, $d^7$ (see Fig. 5). The sliding piece $d^2$ is so mounted as to have also an oscillating lateral play, so that when the device is in position upon the feed board, or table, (indicated by cross-hatching in Fig. 1) the plate may automatically adjust itself to any inequalities of the surface upon which it rests, in order to insure its proper guiding action and prevent sheets of paper, however thin, resting upon the surface of the feed board, from passing under the edge of the plate or sliding pieces resting on the feed board.

To hold the paper close to the surface of the feed board or nose piece, a strip of metal $e$, formed as shown in Figs. 1 and 2, is attached to the forward end of the head, D, with its lower end curved under and resting in contact with the lower end of the piece, $d^2$.

As thus constructed, with the screw rod C, threaded to the distance of two "points" between successive threads, one complete revolution of the thumb nut $c^1$ will advance (or withdraw) the guide piece, $d^2$, two points on the feed board, and fractional revolutions will produce corresponding fractional advances and this, as will be seen, is determined by the registering of the projections, $c^2$ of the thumb nut $c^1$ with the corresponding fixed projection, $b^4$, of the abutment, $b^3$, of the sliding frame.

The entire device is adjustable to any desired pivotal relation on the feed board by reason of its pivotal mounting on the screw bolt, $a^1$ and is secured in adjusted relations by the same bolt, manipulated by its thumb-nut-head, $a^2$; but a more precise adjustment of the guide piece $d^2$ to the edge of the paper being fed, is accomplished by the swivel mounting of the head D. Other details of operation and the special functions of parts have been sufficiently indicated.

The selection of a feed-guide used on printing presses, as here shown and explained, is intended to show the adaptation of the invention to situations requiring a degree of accuracy ordinarily requiring much time and delicate skill. It therefore indicates strikingly its convenience and usefulness, because, as will be obvious, the operator is not required to leave his position at the feed side of the press and can make required adjustments quickly and with exact certainty. Thus by the use of my invention, even the most minute and delicate adjustments require but a small fraction of the time or skill usually necessary, besides attaining more accurate results than are ordinarily practicable. I do not, however, confine my invention to this special use, since it will be obvious that the principle involved may be applied with signal advantages in a wide range of mechanical requirements in the industrial arts,—such, for example, as cabinet work, metal punching, and many other processes.

I claim as my invention and desire to secure by Letters Patent of the United States:

1. An adjustable guide embodying a base plate carrying rigidly affixed thereto a continuously threaded rod, a sliding frame movable and guided on such plate, and a thumb-nut threaded and rotatable upon said rod in operative contact relation at both sides with said sliding frame.

2. In a guide-device of the character indicated, a base, a screw-rod fixedly mounted upon and parallel with the base and threaded to definite pitch corresponding to the scale of the measure employed, a rotating element threaded on the screw-rod, a sliding plate longitudinally moved in relation to the screw by rotation of said element engaging in said plate in fixed lateral contact relations, and corresponding fixed radial projections upon the rotating element and the engaging portion of the sliding plate, registering at given increments of rotation and adapted to act as stops, substantially as herein described.

3. In a guide-device of the character indicated a base frame, a screw rod rigidly affixed to the frame, a sliding plate upon the frame, a rotatable nut threaded upon the screw rod operating in lateral contact with an extension of said frame, and corresponding radial projections upon the frame extension and nut registering at predetermined increments of rotation of the nut.

4. In a guide device of the character indicated, the combination of a pivotally adjustable base plate, a sliding plate guided longitudinally thereon, means for advancing or receding said sliding plate, a swiveled head on said sliding plate, and a vertically and laterally movable guide piece automatically adjustable to inequalities of the table surface.

In testimony whereof I have hereunto set my hand in presence of two subscribing witnesses.

GEORGE C. JAMES.

Witnesses:
    LEWIS M. HOSEA,
    A. L. TILDESBY.

---

Copies of this patent may be obtained for five cents each, by addressing the "Commissioner of Patents, Washington, D. C."